US011315115B2

(12) United States Patent
Zhou

(10) Patent No.: US 11,315,115 B2
(45) Date of Patent: Apr. 26, 2022

(54) BLOCKCHAIN-BASED DATA PROCESSING SYSTEM, METHOD, COMPUTING DEVICE AND STORAGE MEDIUM

(71) Applicant: ADVANCED NEW TECHNOLOGIES CO., LTD., Grand Cayman (KY)

(72) Inventor: Fan Zhou, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 16/875,552

(22) Filed: May 15, 2020

(65) Prior Publication Data

US 2020/0279259 A1 Sep. 3, 2020

Related U.S. Application Data

(63) Continuation of application No. PCT/CN2020/071866, filed on Jan. 14, 2020.

(30) Foreign Application Priority Data

Apr. 12, 2019 (CN) .......................... 201910296014.5

(51) Int. Cl.
*G06Q 20/40* (2012.01)
*G06Q 20/38* (2012.01)
(Continued)

(52) U.S. Cl.
CPC .......... *G06Q 20/401* (2013.01); *G06Q 20/065* (2013.01); *G06Q 20/3825* (2013.01);
(Continued)

(58) Field of Classification Search
CPC ............................... G06Q 40/08; G06Q 30/04
See application file for complete search history.

(56) References Cited

U.S. PATENT DOCUMENTS

2015/0332283 A1 11/2015 Witchey
2016/0117471 A1 4/2016 Belt et al.
(Continued)

FOREIGN PATENT DOCUMENTS

CN 105976231 A 9/2016
CN 108615148 A 10/2018
(Continued)

OTHER PUBLICATIONS

Demartini et al. Blockchain and Smart Contracts for Insurance: Is the Technology Mature Enough?, 2018, Future internet, Feb. 20, 2018, vol. 10 (2), p. 20.*
(Continued)

*Primary Examiner* — Ilse I Immanuel

(57) ABSTRACT

A blockchain-based data processing system may comprise: a transaction-side blockchain node and a server-side blockchain node on a blockchain network maintaining a blockchain. The transaction-side blockchain node may be configured to: create a transaction data structure based on an Unspent Transaction Output (UTXO) model, consolidate transaction data of a transaction according to the transaction data structure to generate shared transaction data, execute a smart contract of the transaction-side blockchain node to automatically determine a to-be-settled commission amount, update the shared transaction data according to the to-be-settled commission amount, collect the updated shared transaction data according to a preset condition, and send a to-be-settled transaction processing request comprising the updated shared transaction data to the server-side blockchain node. The server-side blockchain node may be configured to: receive the to-be-settled transaction processing request, and calculate a sum of the to-be-settled commission amount in the updated shared transaction data.

8 Claims, 4 Drawing Sheets

(51) Int. Cl.
  *H04L 9/06* (2006.01)
  *G06Q 20/06* (2012.01)
(52) U.S. Cl.
  CPC ....... *G06Q 20/3827* (2013.01); *H04L 9/0637* (2013.01); *G06Q 2220/00* (2013.01); *H04L 2209/38* (2013.01)

(56) References Cited

U.S. PATENT DOCUMENTS

| | | | |
|---|---|---|---|
| 2016/0217532 | A1 | 7/2016 | Slavin |
| 2016/0335533 | A1 | 11/2016 | Davis et al. |
| 2017/0039330 | A1 | 2/2017 | Tanner, Jr. et al. |
| 2017/0054611 | A1 | 2/2017 | Tiell |
| 2017/0091397 | A1 | 3/2017 | Shah |
| 2017/0103167 | A1 | 4/2017 | Shah |
| 2017/0103385 | A1* | 4/2017 | Wilson, Jr ........... G06Q 20/401 |
| 2017/0220998 | A1 | 8/2017 | Horn et al. |
| 2017/0236094 | A1 | 8/2017 | Shah |
| 2017/0244721 | A1 | 8/2017 | Kurian et al. |
| 2017/0289111 | A1 | 10/2017 | Voell et al. |
| 2017/0352027 | A1 | 12/2017 | Zhang et al. |
| 2017/0372300 | A1 | 12/2017 | Dunlevy et al. |
| 2018/0091524 | A1 | 3/2018 | Setty et al. |
| 2019/0052454 | A1* | 2/2019 | Wright ................. H04L 9/0861 |
| 2020/0258061 | A1* | 8/2020 | Beadles ............. G06Q 20/3678 |

FOREIGN PATENT DOCUMENTS

| | | | |
|---|---|---|---|
| CN | 108776929 | A | 11/2018 |
| CN | 108846659 | A | 11/2018 |
| CN | 109035018 | A | 12/2018 |
| CN | 109102281 | A | 12/2018 |
| CN | 109272403 | A | 1/2019 |
| CN | 109493203 | A | 3/2019 |
| CN | 109523385 | A | 3/2019 |
| CN | 109544354 | A | 3/2019 |
| CN | 109961365 | A * | 7/2019 |
| CN | 110175913 | A | 8/2019 |

OTHER PUBLICATIONS

First Search dated Apr. 3, 2020, issued in related Chinese Application No. 201910296014.5 (2 pages).

First Office Action dated Apr. 13, 2020, issued in related Chinese Application No. 201910296014.5, with English machine translation (25 pages).

Supplemental Search dated May 22, 2020, issued in related Chinese Application No. 201910296014.5 (2 pages).

Second Office Action dated Jun. 1, 2020, issued in related Chinese Application No. 201910296014.5, with English machine translation (25 pages).

Third Office Action dated Jul. 15, 2020, issued in related Chinese Application No. 201910296014.5, with English machine translation (21 pages).

Supplemental Search for Chinese Application No. 201910296014.5 dated Oct. 25, 2020.

Written Opinion and International Search Report for PCT Application No. PCT/CN2020/071866 made available to public on Oct. 15, 2020.

* cited by examiner

BLOCKCHAIN-BASED DATA PROCESSING SYSTEM, METHOD, COMPUTING DEVICE AND STORAGE MEDIUM

CROSS REFERENCE TO RELATED APPLICATIONS

The present application is a continuation application of International Patent Application No. PCT/CN2020/071866, filed on Jan. 14, 2020, which claims priority to Chinese Patent Application No. 201910296014.5, filed on Apr. 12, 2019. The entire content of the above referenced applications are incorporated herein by reference.

TECHNICAL FIELD

The present specification relates to the field of blockchain technologies, and in particular, to a blockchain-based data processing system, method, computing device and storage medium.

BACKGROUND

Along with the economic development, insurance has become an important component of life. Nowadays, there are increasingly diversified ways of insurance sales. For example, many insurance companies delegate third-party service agencies to sell insurance products on their behalf. In this way, insurance commissions need to be settled between insurance companies and third-party service agencies. However, according to the current technologies, an insurance company and a third-party service platform need to agree on transaction data before settling the commissions. Namely, the insurance company and the third-party service platform need to verify transaction data within a certain period to identify whether there is data discrepancy between different agencies regarding the same transaction.

According to an inter-agency data processing method of the current technologies, a third-party service platform packages transaction data generated within a preset period of time and sends the packaged transaction data to an insurance company. The insurance company verifies the transaction data and settles the commissions after the verification is successful. However, the commission settling method adopted by the current technologies requires high development cost. The third-party service platform needs to transfer transaction data out of a core transaction system and send the transaction data, in file transmission or other manners, to the insurance company for verification. The entire process takes a long time and has a poor time efficiency. Moreover, if one agency disagrees with the transaction data in the future, there is lack of an arbitration mechanism that is acceptable to both sides.

SUMMARY

In view of this, embodiments of the present specification provide a blockchain-based data processing system, method, computing device and storage medium, so as to solve the technical defects of the current technologies.

According to a first aspect of the embodiments of the present specification, a blockchain-based data processing system is provided, comprising: a transaction-side blockchain node and a server-side blockchain node on a blockchain network maintaining a blockchain, wherein: the transaction-side blockchain node is configured to: create a transaction data structure for a target transaction based on an Unspent Transaction Output (UTXO) model, consolidate to-be-processed transaction data according to the transaction data structure to generate shared transaction data, execute a smart contract of the transaction-side blockchain node to automatically determine a to-be-settled amount when information contained in the shared transaction data meets an execution condition of the smart contract, update the shared transaction data according to the to-be-settled amount and execute a bookkeeping operation, collect the updated shared transaction data according to a preset condition, and send a to-be-settled transaction processing request to the server-side blockchain node, the to-be-settled transaction processing request comprising the updated shared transaction data; and the server-side blockchain node is configured to: receive the to-be-settled transaction processing request, and calculate a sum of the to-be-settled amount in the updated shared transaction data.

In some embodiments, the transaction-side blockchain node comprises: a transaction sub-node and a bookkeeping sub-node, wherein: the transaction sub-node is configured to: create the transaction data structure for the target transaction based on the Unspent Transaction Output (UTXO) model, consolidate the to-be-processed transaction data according to the transaction data structure to generate the shared transaction data, and send a bookkeeping request to the bookkeeping sub-node, the bookkeeping request comprising the shared transaction data, and the bookkeeping sub-node is configured to: receive the bookkeeping request, automatically determine the to-be-settled amount when the information contained in the shared transaction data meets the execution condition of the smart contract of the transaction-side blockchain node, and update the shared transaction data according to the to-be-settled amount and execute a bookkeeping operation.

In some embodiments, the bookkeeping sub-node is further configured to collect the updated shared transaction data according to the preset condition, and send the to-be-settled transaction processing request to the server, the to-be-settled transaction processing request comprising the updated shared transaction data.

In some embodiments, the transaction data structure comprises a transaction ID, a transaction input unit, and a transaction output unit, the transaction input unit comprising a signature unlocking script for using (e.g., spending) an account balance and the transaction output unit comprising a locking script of an output balance for specifying a designated account to spend a corresponding UTXO unit.

In some embodiments, the bookkeeping sub-node is further configured to: calculate the to-be-settled amount according to a transaction amount in the shared transaction data and a ratio of the to-be-settled amount to the transaction amount, determine an output account according to the shared transaction data and an blockchain account mapping table in the smart contract, and update an output unit of the shared transaction data based on the to-be-settled amount and the output account.

In some embodiments, the bookkeeping sub-node is further configured to: monitor whether one of a state machine, an event and a trigger condition in the smart contract meets a preset execution condition, and; if so, automatically execute the smart contract.

In some embodiments, transaction sub-node is further configured to: obtain a method for calculating the to-be-settled amount, determine a mapping relationship between transaction information and bookkeeping accounts, generate a corresponding account mapping table according to the mapping relationship between transaction information and bookkeeping accounts, create the smart contract according to the method for calculating the to-be-settled amount and the account mapping table, and write the smart contract into the blockchain network.

In some embodiments, the transaction-side blockchain node is further configured to: transfer the updated shared transaction data signed with a private key into the blockchain network, validate the updated shared transaction data that is transferred into the blockchain network, when the validation of the updated shared transaction data is successful, consolidate the updated shared transaction data into a hash block ID and broadcast the hash block ID in the blockchain network.

In some embodiments, the bookkeeping sub-node is further configured to: collect shared transaction data according to the preset condition, consolidate the shared transaction data to generate to-be-settled transaction data, generate a hash value corresponding to the to-be-settled transaction data, and send a to-be-settled transaction processing request to the server-side blockchain node, the to-be-settled transaction processing request comprising the to-be-settled transaction data and the hash value.

In some embodiments, the server-side blockchain node is further configured to: obtain the to-be-settled transaction data and the corresponding hash value in the to-be-settled transaction processing request, validate the to-be-settled transaction processing request based on the hash value, when the validation is successful: determining a sum of one or more to-be-settled amounts in the to-be-settled transaction data, and update an output unit of the to-be-settled transaction data based on the sum.

In some embodiments, the server-side blockchain node is further configured to write the updated to-be-settled transaction data into the blockchain.

According to another aspect of the embodiments of the present specification, a blockchain-based data processing method applied on a transaction-side blockchain node is provided, the method comprising: creating a transaction data structure for a target transaction based on an Unspent Transaction Output (UTXO) model; consolidating to-be-processed transaction data according to the transaction data structure to generate shared transaction data; executing a smart contract of the transaction-side blockchain node to automatically determine a to-be-settled amount when information contained in the shared transaction data meets an execution condition of the smart contract; updating the shared transaction data according to the to-be-settled amount and executing a bookkeeping operation; collecting the updated shared transaction data according to a preset condition; and sending a to-be-settled transaction processing request to a server-side blockchain node, the to-be-settled transaction processing request comprising the updated shared transaction data.

According to another aspect of the embodiments of the present specification, a computing device is provided, comprising a memory, a processor, and a computer instruction stored on the memory and capable of running on the processor, wherein the processor, when executing the instruction, implements steps of the blockchain-based data processing method.

In the embodiments of the present specification, the transaction-side blockchain node creates a transaction data structure for a target transaction, consolidates to-be-processed transaction data according to the transaction data structure to generate shared transaction data, automatically executes a task (through a smart contract) to calculate a to-be-settled amount when information contained in the shared transaction data meets an automatic smart contract execution condition of the transaction-side blockchain node, generates a corresponding execution result, updates the shared transaction data according to the execution result and executes a bookkeeping operation, collects the updated shared transaction data according to a preset condition, and sends a to-be-settled transaction processing request to the server-side blockchain node; and the server-side blockchain node receives the to-be-settled transaction processing request, and calculates a sum of to-be-settled amounts in the updated shared transaction data. In the embodiments of the present specification, a distributed ledger is created for the transaction end and the server end that is jointly maintained by both sides. Transaction data generated by each transaction at the transaction is subject to real-time calculation on the ledger, which greatly improves the efficiency of data settlement. At the same time, the use of the blockchain may ensure the immutability and accuracy of transaction data.

DETAILED DESCRIPTION

Exemplary details are described below to facilitate thorough understanding of the present application. However, the present application may be implemented in many other manners different from the description herein. Those skilled in the art may make similar extensions without departing from the connotation of the present application. Therefore, the present application is not limited by the exemplary embodiments disclosed below.

Terms used in one or more embodiments of the present specification are only for the purpose of describing particular embodiments, rather than limiting one or more embodiments of the present specification. "A," "the," and "said" in the singular form used in one or more embodiments of the present specification and the appended claims are intended to include the plural form as well, unless clearly indicated in the context to have other meanings. It should also be understood that the term "and/or" used in one or more embodiments of the present specification refers to and includes any or all possible combinations of one or more associated listed items.

It should be understood that terms such as first, second, and the like may be used in one or more embodiments of the present specification to describe various information, but the information shall not be limited to these terms. These terms are only used to differentiate information of the same type from each other. For example, without departing from the scope of one or more embodiments of the present specification, first may also be referred to as second, and similarly, second may also be referred to as first. Depending on the context, the term "if" used here may be construed as "when . . . " or "at the time of . . . " or "in response to determination."

First, terms involved in one or more embodiments of the present invention will be explained.

Unspent Transaction Output: the basic unit of Bitcoin transactions, which is referred to as UTXO in short. UTXO is a certain amount of Bitcoin currency that cannot be further divided, is locked by an owner or recorded in a blockchain, and is identified by the entire network as a currency unit.

A blockchain-based data processing system, method, computing device and storage medium are provided in the present application, which will be described in detail one by one in the following embodiments.

Figure 1:
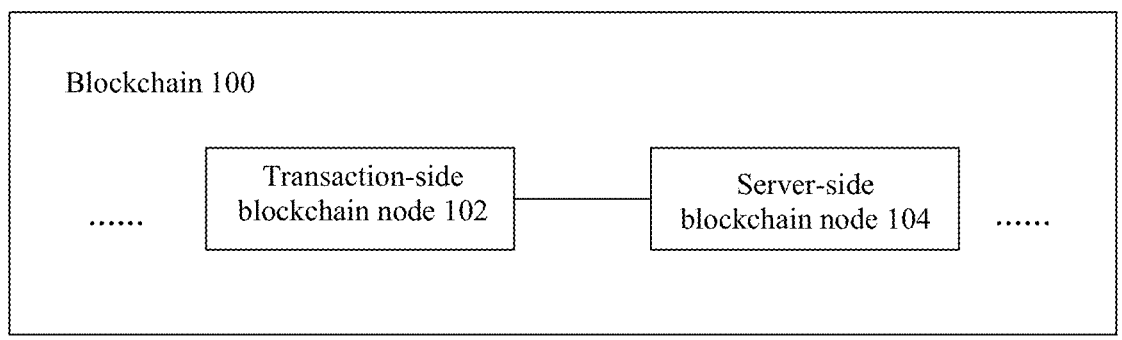
FIG. 1 is a schematic diagram of a blockchain-based data processing system according to some embodiments of the present application.

FIG. 1 is a schematic diagram of a blockchain-based data processing system according to some embodiments of the present specification. The system comprises: a transaction-side blockchain node 102 and a server-side blockchain node 104 on a blockchain 100.

The transaction-side blockchain node 102 is configured to create a transaction data structure for a target transaction, consolidate to-be-processed transaction data according to the transaction data structure to generate shared transaction data, automatically execute a task (through a smart contract) to calculate a to-be-settled amount when information contained in the shared transaction data meets an automatic smart contract execution condition of the transaction-side blockchain node, generate a corresponding execution result, update the shared transaction data according to the execution result and execute a bookkeeping operation, collect the updated shared transaction data according to a preset condition, and send a to-be-settled transaction processing request to the server-side blockchain node, the to-be-settled transaction processing request comprising the updated shared transaction data.

The server-side blockchain node 104 is configured to receive the to-be-settled transaction processing request, and calculate a sum of to-be-settled amounts in the updated shared transaction data.

In some embodiments, the transaction-side blockchain node comprises: a transaction sub-node and a bookkeeping sub-node; wherein the transaction sub-node is configured to create a transaction data structure for a target transaction, standardize to-be-processed transaction data according to the transaction data structure, consolidate the standardized transaction data according to the transaction data structure to generate shared transaction data, and send a bookkeeping request to the bookkeeping sub-node, the bookkeeping request comprising the shared transaction data; and the bookkeeping sub-node is configured to receive the bookkeeping request, automatically execute a task to calculate a to-be-settled amount when the automatic smart contract execution condition in the bookkeeping sub-node is met, generate a corresponding execution result, update the shared transaction data according to the smart contract execution result and execute a bookkeeping operation.

In some embodiments, the bookkeeping sub-node is further configured to automatically generate a to-be-settled transaction processing request when the updated shared transaction data satisfy a preset condition, the to-be-settled transaction processing request comprising the updated shared transaction data, and send a to-be-settled transaction processing request to the server.

In some embodiments, the transaction sub-node is further configured to create a transaction data structure based on a UTXO model, the transaction data structure comprising a transaction ID, a transaction input unit, and a transaction output unit, the transaction input unit comprising a signature unlocking script for spending an account balance and the transaction output unit comprising a locking script of an output balance for defining a corresponding UTXO unit that only a designated account may use.

Two different recording modes are used in a blockchain network. The first method is called a "UTXO" model, and the second method is an "account/balance" model. Bitcoin uses the "UTXO" model, while Ethereum uses the "account/balance" model. In some embodiments, the transaction data structure is created based on the "UTXO" model, in which each transaction in Bitcoin spends an amount remaining from previous transactions, and this amount is referred to as "Unspent Transaction Output." A new "Unspent Transaction Output" is produced after each transaction, and all "Unspent Transaction Outputs" are stored in nodes that are fully synchronous.

In some embodiments, the bookkeeping sub-node is further configured to calculate the to-be-settled amount according to a transaction amount in the shared transaction data and a ratio of the to-be-settled amount to the transaction amount, determine an output account according to the shared transaction data and an account mapping table in the smart contract, and update an output unit of the shared transaction data based on the to-be-settled amount and the output account.

In some embodiments, the bookkeeping sub-node is further configured to monitor whether a state machine, an event and/or a trigger condition in the smart contract meets a preset execution condition, and if any of the state machine, the event and/or the trigger condition in the smart contract meets the preset execution condition, the smart contract is automatically executed.

In some embodiments, the transaction sub-node is further configured to obtain a method for calculating the to-be-settled amount, determine a mapping relationship between transaction information and bookkeeping accounts, generate a corresponding account mapping table according to the mapping relationship between transaction information and bookkeeping accounts, create the smart contract according to the method for calculating the to-be-settled amount and the account mapping table, and write the smart contract into a blockchain network.

In some embodiments, both the transaction sub-node and the bookkeeping sub-node may be configured to create the smart contract.

In some embodiments, the transaction-side blockchain node is further configured to transfer the updated shared transaction data signed with a private key into the blockchain network, validate the updated shared transaction data that is transferred into the blockchain network, consolidate the updated shared transaction data into a hash block ID when the validation of the updated shared transaction data is successful, and broadcast the hash block ID to the entire network.

In some embodiments, the bookkeeping sub-node is further configured to collect shared transaction data according to a preset condition, consolidate the shared transaction data to generate to-be-settled transaction data, generate a hash value based on the to-be-settled transaction data, and send a to-be-settled transaction processing request to the server-side blockchain node, the to-be-settled transaction processing request comprising the to-be-settled transaction data and the corresponding hash value.

In some embodiments, the server-side blockchain node is further configured to obtain the to-be-settled transaction data and the corresponding hash value carried in the to-be-settled transaction processing request, validate the to-be-settled transaction processing request based on the hash value, calculate a sum of to-be-settled amounts in the to-be-settled transaction data when the validation is successful, update an output unit of the to-be-settled transaction data based on a calculation result, and complete the to-be-settled transaction processing on the transaction-side blockchain node based on the calculation result.

In some embodiments, the server-side blockchain node is further configured to write the updated to-be-settled transaction data into the blockchain.

In some embodiments, the server-side blockchain node is further configured to transfer the updated to-be-settled transaction data signed with a private key into the blockchain network, validate the updated to-be-settled transaction data that is transferred into the blockchain network, consolidate the updated to-be-settled transaction data into a hash block ID when the validation of the updated to-be-settled transaction data is successful, and broadcast the hash block ID to the entire network.

In some embodiments, a distributed ledger is created between the transaction side and the server side that is jointly maintained by both sides. Transaction data generated by each transaction at the transaction is subject to real-time calculation on the ledger, which greatly improves the efficiency of data settlement. At the same time, the use of the blockchain may ensure the immutability and accuracy of transaction data.

Figure 2:
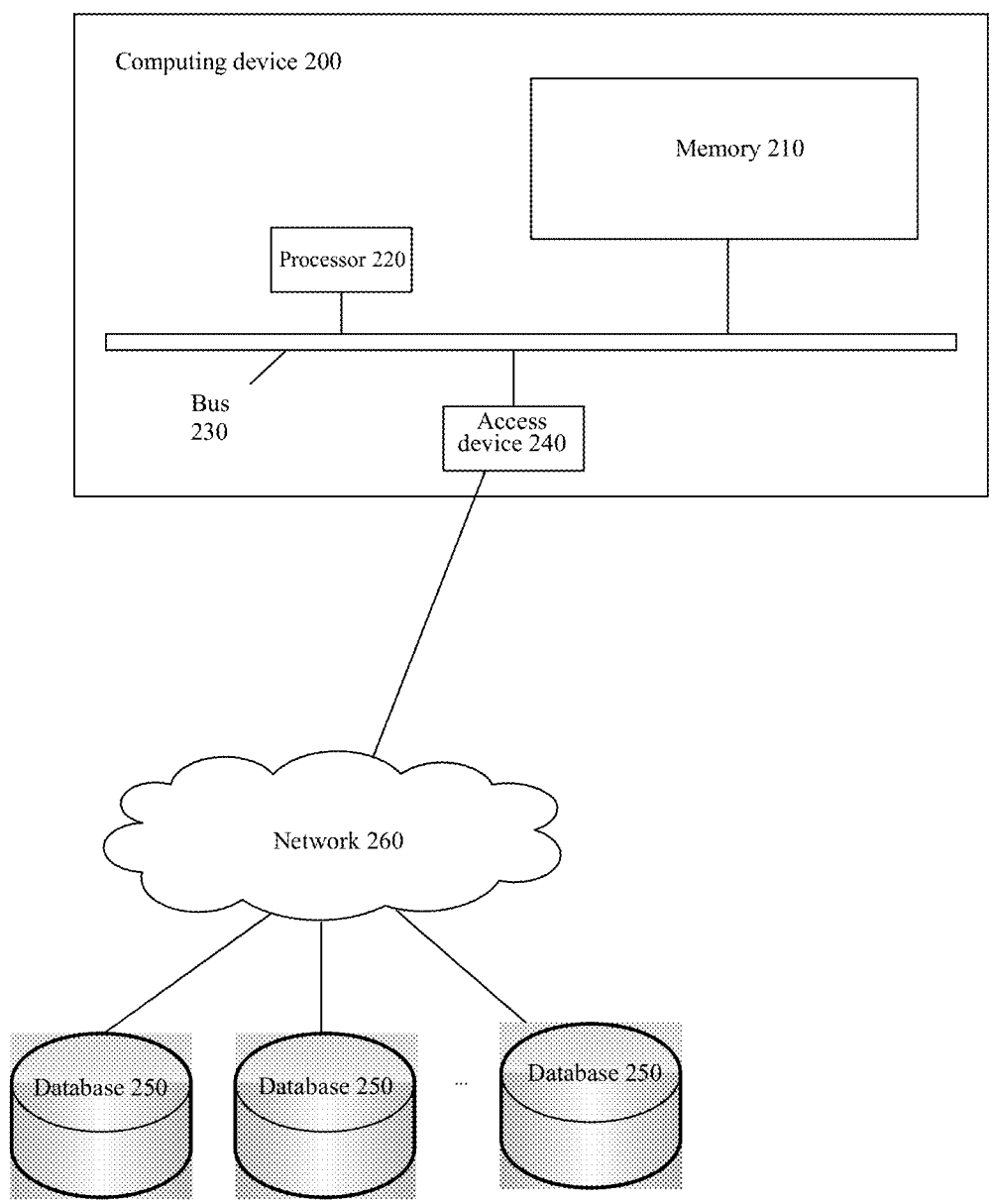
FIG. 2 is a structural block diagram of a computing device according to some embodiments of the present application.

FIG. 2 is a structural block diagram of a computing device 200 according to some embodiments of the present application. The computing device 200 comprises components that include, but are not limited to, a memory 210 and a processor 220. The processor 220 and the memory 210 are connected via a bus 230, and a database 250 is configured to store data.

The computing device 200 further comprises an access device 240. The access device 240 enables the computing device 200 to communicate via one or more networks 260. Examples of these networks include a public switched telephone network (PSTN), a local area network (LAN), a wide area network (WAN), a personal area network (PAN, or a combination of communication networks like the Internet. The access device 240 may comprise one or more of any type of wired or wireless network interfaces (e.g., a network interface card (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, etc.

In some embodiments, the above components of the computing device 200 and other components not shown in FIG. 2 may also be connected with each other, for example, via a bus. It should be understood that the structural block diagram of the computing device shown in FIG. 2 is for exemplary purpose only, rather than a limitation to the scope of the present application. Those skilled in the art may add or replace with other components as needed.

The computing device 200 may be a static or mobile computing device of any type, comprising a mobile computer or a mobile computing device (for example, a tablet computer, a personal digital assistant, a laptop computer, a netbook, etc.), a mobile phone (for example, a smart phone), a wearable computing device (for example, a smart watch, smart glasses, etc.) or other types of mobile devices, or a static computing device, such as a desktop computer or PC. The computing device 200 may also be a mobile or static server.

Figure 3:
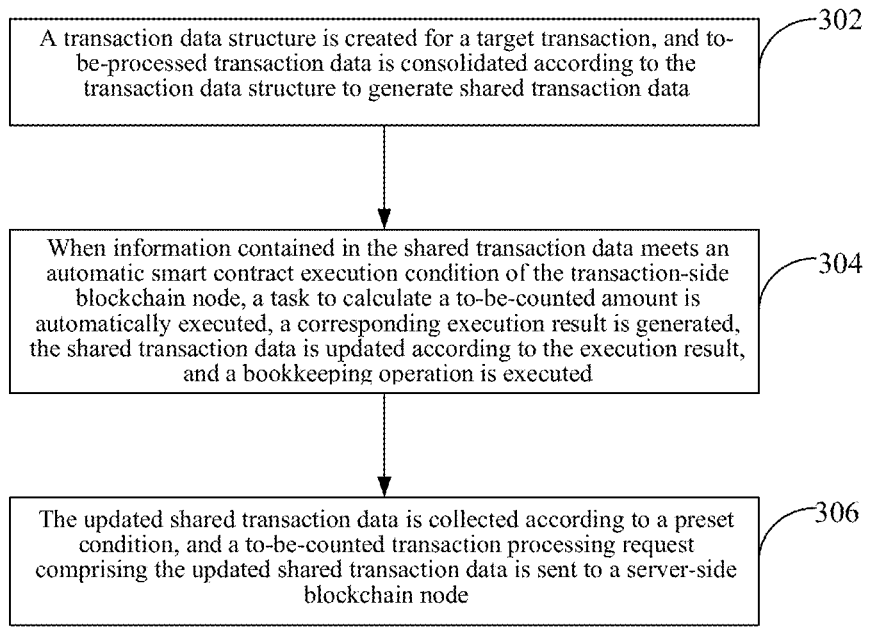
FIG. 3 is a flow chart of a blockchain-based data processing method according to some embodiments of the present application.

Here, the processor 220 may implement steps of the blockchain-based data processing method as shown in FIG. 3. FIG. 3 is a flow chart of a blockchain-based data processing method according to some embodiments of the present application. The method comprises Step 302 to Step 306.

In Step 302, a transaction data structure is created for a target transaction, and to-be-processed transaction data is consolidated according to the transaction data structure to generate shared transaction data.

In some embodiments, the creating a transaction data structure for a target transaction comprises: creating a transaction data structure based on a UTXO model, the transaction data structure comprising a transaction ID, a transaction input unit, and a transaction output unit.

Take the insurance industry as an example. The created transaction data structure is as shown in Table 1.

TABLE 1

| | Input | | | | | Output | |
|---|---|---|---|---|---|---|---|
| Transaction ID | Source Transaction ID | Account | Transaction Type | Transaction Information | Amount | Account | Amount |
| Each transaction has a unique ID number | An upstream transaction to this transaction. For example, for commission settlement, the upstream transaction is an unsettled commission record | An input account of this transaction | To purchase an insurance policy, to cancel an insurance policy, to make corrections, etc. | Key transaction information required for commission calculation, such as the ID number of an insured, start and end dates, premium, amount insured, etc. | Amount incurred to the input account | An output account of this transaction | Amount incurred to the output account |

Table 1 comprises a transaction ID, an input unit, and an output unit. One transaction ID is generated for each transaction. The input unit comprises a source transaction ID, an account, a transaction type, and an amount, wherein the source transaction ID is the source of the amount. In the insurance industry, the source transaction ID may be an insurance policy number. The account is an income account of the amount, the transaction information comprises user information and insurance policy information, and the output unit comprises an account and an amount. Take calculation of policy commission as an example, the account of the output unit is an account for receiving commissions, and the amount is an amount of the commissions.

In some embodiments, still taking the insurance industry as an example, User A purchases a health insurance product from an insurance company C on the Internet sales platform B. The transaction ID is A001, the insurance policy number is C00100001, the premium is 3000 Yuan, the amount insured is 450000, and the rate for the sales commission of the Internet sales platform B is 3% of the premium.

The above to-be-processed transaction data may first be standardized according to the transaction data structure shown in Table 1, and then be consolidated into shared transaction data as shown in Table 2.

data, whether a state machine, an event and/or a trigger condition in the smart contract of the transaction-side blockchain node meets a preset execution condition is monitored. If any of the state machine, the event and/or the trigger condition in the smart contract meets the preset execution condition, the smart contract meets the automatic execution condition, the task to calculate a to-be-settled amount is automatically executed. The to-be-settled amount (e.g., a to-be-settled commission amount) is calculated according to a transaction amount in the shared transaction data and a ratio of the to-be-settled amount to the transaction amount. An output account is determined according to the shared transaction data and an account mapping table in the smart contract, and an output unit of the shared transaction data is updated based on the to-be-settled amount and the output account.

In some embodiments, still taking the insurance industry as an example, the to-be-settled amount is the commission generated by each transaction, and the transaction amount is the amount insured of each transaction. Taking Table 2 in Step 302 as an example, the amount insured in the shared

TABLE 2

| Transaction ID | Input | | | | | Output | |
|---|---|---|---|---|---|---|---|
| | Source Transaction ID | Account | Transaction Type | Transaction Information | Amount | Account | Amount |
| A001 | C00100001 | Insurance company C | To purchase an insurance | Insured: A Seller: Internet sales platform B Premium: 3000 Amount insured: 450000 Commission rate: 0.03 insurance purchase date: 2018 Feb. 20 | 3000 | | |

In Step 304, when information contained in the shared transaction data meets an automatic smart contract execution condition of the transaction-side blockchain node, a task to calculate a to-be-settled amount is automatically executed, a corresponding execution result is generated, the shared transaction data is updated according to the execution result, and a bookkeeping operation is executed.

In some embodiments, after the to-be-processed transaction data is standardized and consolidated according to the transaction data structure to generate the shared transaction transaction data is 3000 and the commission is 3% of the amount insured, then it may be calculated that the commission generated by this transaction is 90. According to the account mapping table in the smart contract, it may be determined that the output account is B-health insurance-online sales-settlement pending.

A result from updating Table 2 based on the commission amount and the output account is shown in Table 3.

TABLE 3

| Transaction ID | Input | | | | | Output | |
|---|---|---|---|---|---|---|---|
| | Source Transaction ID | Account | Transaction Type | Transaction Information | Amount | Account | Amount |
| A001 | C00100001 | Insurance company C | To purchase an insurance | Insured: A Seller: Internet sales platform B Premium: 3000 Amount insured: 450000 Commission rate: 0.03 Insurance purchase date: 2018 Feb. 20 | 3000 | B-health insurance-online sales-settlement pending | 90 |

In some embodiments, a new transaction data structure is created for each transaction that has occurred. When the number of new transaction data structures reaches a preset threshold value N, the transaction-side blockchain node packages and broadcasts the N transaction data structures to other blockchain nodes, so that other blockchain nodes reach a consensus on the transaction data structures.

For example, the transaction-side blockchain node transfers the updated shared transaction data signed with a private key (as a signature) into the blockchain network, and validates the updated shared transaction data that is transferred into the blockchain network. When the validation of the updated shared transaction data is successful, the transaction-side blockchain node consolidates the updated shared transaction data into a hash block ID and broadcasts the hash block ID to the entire network.

In Step 306, the updated shared transaction data is collected according to a preset condition, and a to-be-settled transaction processing request comprising the updated shared transaction data is automatically generated and sent to a server-side blockchain node.

In some embodiments, the collecting the updated shared transaction data according to a preset condition, and generating and sending a to-be-settled transaction processing request to a server-side blockchain node may be implemented by the following steps: collecting shared transaction data according to the preset condition; consolidating the shared transaction data to generate to-be-settled transaction data, and processing the to-be-settled transaction data to generate a corresponding hash value; and sending to the server-side blockchain node a to-be-settled transaction processing request comprising the to-be-settled transaction data and the corresponding hash value.

In some embodiments, the preset condition may comprise whether the number of newly generated transactions reaches a preset threshold, whether a total amount of the newly generated transactions reaches a preset threshold (e.g., a dollar amount), or another suitable condition. For example, the preset condition may be whether 3 new transactions have been generated. Once the Internet platform B has generated 3 new transactions, data from these 3 transactions is consolidated to generate to-be-settled transaction data.

Still taking the insurance industry as an example, the to-be-settled transaction data generated by consolidating the data from these 3 transactions is shown in Table 4.

TABLE 4

| | Input | | | | Output | |
|---|---|---|---|---|---|---|
| Transaction ID | Source Transaction ID | Account | Transaction Type | Transaction Information | Amount | Account Amount |
| A100 | A001 | B-health insurance-online sales-settlement pending | Commission settlement | Insured: A<br>Seller: Internet sales platform B<br>Premium: 3000<br>Amount insured: 450000<br>Commission rate: 0.03<br>Insurance purchase date: 2018 Feb. 20 | 90 | |
| | A002 | B-health insurance-online sales-settlement pending | Commission settlement | Insured: D<br>Seller: Internet sales platform B<br>Premium: 4000<br>Amount insured: 1000000<br>Commission rate: 0.03<br>Insurance purchase date: 2018 Feb. 20 | 120 | |
| | A003 | B-health insurance-online sales-settlement pending | Commission settlement | Insured: E<br>Seller: Internet sales platform B<br>Premium: 2000<br>Amount insured: 300000<br>Commission rate: 0.03<br>Insurance purchase date: 2018 Feb. 20 | 60 | |

In some embodiments, the transaction-side blockchain node processes the to-be-settled transaction data to generate a corresponding hash value, and sends to the server-side blockchain node a to-be-settled transaction processing request comprising the to-be-settled transaction data and the corresponding hash value. The server-side blockchain node receives the to-be-settled transaction processing request and validates the band pass and the transaction data based on the hash value. When the validation is successful, the server-side blockchain node calculates a sum of to-be-settled amounts in the to-be-settled transaction data, updates an output unit of the to-be-settled transaction data based on a calculation result shown in Table 5, and completes the to-be-settled transaction processing on the transaction-side blockchain node based on the calculation result.

TABLE 5

| Transaction ID | Source Transaction ID | Account | Transaction Type | Transaction Information | Amount | Output Account | Amount |
|---|---|---|---|---|---|---|---|
| A100 | A001 | B-health insurance-online sales-settlement pending | Commission settlement | Insured: A<br>Seller: Internet sales platform B<br>Premium: 3000<br>Amount insured: 450000<br>Commission rate: 0.03<br>Insurance purchase date: 2018 Feb. 20 | 90 | B-health insurance - online sales - settled | 270 |
| | A002 | B-health insurance-online sales-settlement pending | Commission settlement | Insured: D<br>Seller: Internet sales platform B<br>Premium: 4000<br>Amount insured: 1000000<br>Commission rate: 0.03<br>Policy purchase date: 2018 Feb. 20 | 120 | | |
| | A003 | B-health insurance-online sales-settlement pending | Commission settlement | Insured: E<br>Seller: Internet sales platform B<br>Premium: 2000<br>Amount insured: 300000<br>Commission rate: 0.03<br>Insurance purchase date: 2018 Feb. 20 | 60 | | |

The insurance company C transfers a corresponding amount of virtual currency into a corresponding account according to the account and amount of the output unit in Table 5, executes a bookkeeping operation, and writes the updated to-be-settled transaction data into the blockchain.

The above preset condition (e.g., 3 new transactions have been generated) is just an example, and in exemplary applications, the preset condition may be determined according to actual needs, which is not limited here.

In some embodiments, before creating a transaction data structure for a target transaction, the transaction-side blockchain node first creates a smart contract. The smart contract comprises a method for calculating the to-be-settled amount and an account mapping table. The process of creating a smart contract may be implemented by the following steps: obtaining a process for calculating the to-be-settled amount, determining a mapping relationship between transaction information and bookkeeping accounts, and generating a corresponding account mapping table according to the mapping relationship between transaction information and bookkeeping accounts; creating the smart contract according to the process for calculating the to-be-settled amount and the account mapping table; and writing the smart contract into a blockchain network.

In some embodiments, taking the insurance industry as an example, the to-be-settled amount is commission, and the method for calculating the to-be-settled amount is the ratio of the commission to the amount insured. To determine a mapping relationship between transaction information and bookkeeping accounts is to determine a bookkeeping account corresponding to information of a transaction. Assuming that a part of the information of a transaction is that the user A purchases a health insurance product from the insurance company C on the Internet sales platform B, then it may be determined that the bookkeeping account corresponding to this transaction is the Internet sales platform B-health insurance-online sales-commission settlement pending.

In some embodiments, an exemplary manner in which the smart contract is written into the blockchain network may be: transferring the updated shared transaction data signed with a private key into the blockchain network, validating the updated shared transaction data that is transferred into the blockchain network, consolidating the updated shared transaction data into a hash block ID when the validation of the updated shared transaction data is successful, and broadcasting the hash block ID to the entire network.

In some embodiments, a transaction data structure is created based on the UTXO model, and all pieces of transaction data are consolidated according to the transaction data structure, which facilitates the calculation of a total amount of commissions by the insurance company. Moreover, this model may provide more privacy for a user in an unlocking script of the input and output units. After the calculation of to-be-settled amount is completed for each piece of transaction data, the transaction-side blockchain node writes the transaction data into the blockchain, and after the calculation of a sum of to-be-settled amounts in the to-be-settled transaction data is completed, the server-side blockchain node writes the to-be-settled transaction data into the blockchain, which ensures the immutability of the data.

Figure 4:
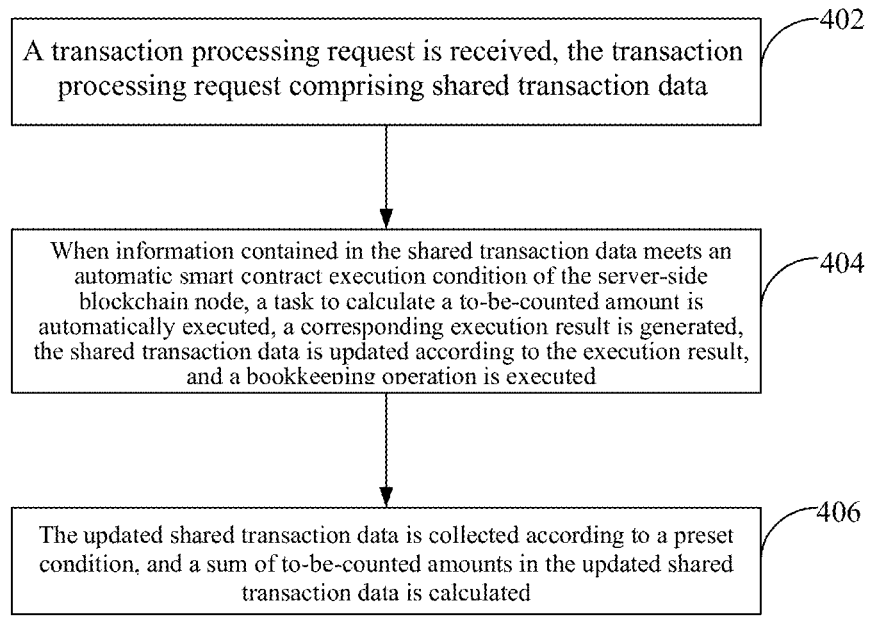
FIG. 4 is a flow chart of a blockchain-based data processing method according to some embodiments of the present application.

FIG. 4 is a flow chart of a blockchain-based data processing method according to some embodiments of the present application. The method comprises Step 402 to Step

406. In Step 402, a transaction processing request is received, the transaction processing request comprising shared transaction data.

In some embodiments, the transaction-side blockchain node creates a transaction data structure for a target transaction based on a UTXO model, the transaction data structure comprising a transaction ID, a transaction input unit, and a transaction output unit, consolidates to-be-processed transaction data according to the transaction data structure to generate shared transaction data, and sends a transaction processing request to the server-side blockchain node, the transaction processing request comprising the shared transaction data.

In some embodiments, before receiving the transaction processing request, the server-side blockchain node creates a smart contract. The smart contract comprises a method for calculating the to-be-settled amount and an account mapping table. The process of creating a smart contract may be implemented by the following steps: obtaining a process for calculating the to-be-settled amount, determining a mapping relationship between transaction information and bookkeeping accounts, and generating a corresponding account mapping table according to the mapping relationship between transaction information and bookkeeping accounts; creating the smart contract according to the process for calculating the to-be-settled amount and the account mapping table; and writing the smart contract into a blockchain network.

In some embodiments, the updated to-be-settled transaction data signed with a private key is transferred into the blockchain network, and the updated shared transaction data that is transferred into the blockchain network is validated. When the validation of the updated shared transaction data is successful, the updated shared transaction data is consolidated into a hash block ID, and the hash block ID is broadcast to the entire network.

In Step 404, when information contained in the shared transaction data meets an automatic smart contract execution condition of the server-side blockchain node, a task to calculate a to-be-settled amount is automatically executed, a corresponding execution result is generated, the shared transaction data is updated according to the execution result, and a bookkeeping operation is executed.

In some embodiments, after receiving the transaction processing request, the server-side blockchain node monitors whether a state machine, an event and/or a trigger condition in the smart contract of the server-side blockchain node meets a preset execution condition. If any of the state machine, the event and/or the trigger condition in the smart contract meets the preset execution condition, the smart contract meets the automatic execution condition, the task to calculate a to-be-settled amount is automatically executed, the to-be-settled amount is calculated according to a transaction amount in the shared transaction data and a ratio of the to-be-settled amount to the transaction amount, an output account is determined according to the shared transaction data and an account mapping table in the smart contract, an output unit of the shared transaction data is updated based on the to-be-settled amount and the output account, and a bookkeeping operation is executed.

In some embodiments, a new transaction data structure is created for each transaction that has occurred. When the number of new transaction data structures reaches a preset threshold value N, the server-side blockchain node packages and broadcasts the N transaction data structures to other blockchain nodes, so that other blockchain nodes reach a consensus on the transaction data structures.

For example, the server-side blockchain node transfers the updated shared transaction data signed with a private key into the blockchain network, and validates the updated shared transaction data that is transferred into the blockchain network. When the validation of the updated shared transaction data is successful, the server-side blockchain node consolidates the updated shared transaction data into a hash block ID and broadcasts the hash block ID to the entire network.

In Step 406, the updated shared transaction data is collected according to a preset condition, and a sum of to-be-settled amounts in the updated shared transaction data is calculated.

In some embodiments, the server-side blockchain node collects the updated shared transaction data according to a preset condition, consolidates the updated shared transaction data to generate to-be-settled transaction data, and calculates a sum of to-be-settled amounts in the to-be-settled transaction data. The server-side blockchain node updates an output unit of the to-be-settled transaction data based on a calculation result, completes the to-be-settled transaction processing on the transaction-side blockchain node based on the calculation result, and writes the updated to-be-settled transaction data into the blockchain.

For example, the method for writing the updated to-be-settled transaction data into the blockchain may be as follows: transferring the updated to-be-settled transaction data signed with a private key into the blockchain network, validating the updated to-be-settled transaction data that is transferred into the blockchain network, consolidating the updated to-be-settled transaction data into a hash block ID when the validation of the updated to-be-settled transaction data is successful, and broadcasting the hash block ID to the entire network.

In some embodiments, real-time performance is ensured by transferring each piece of newly generated transaction data to a blockchain node in real time for commission calculation. Moreover, the immutability of the data is achieved by broadcasting the calculation result to other blockchain nodes.

Figure 5:
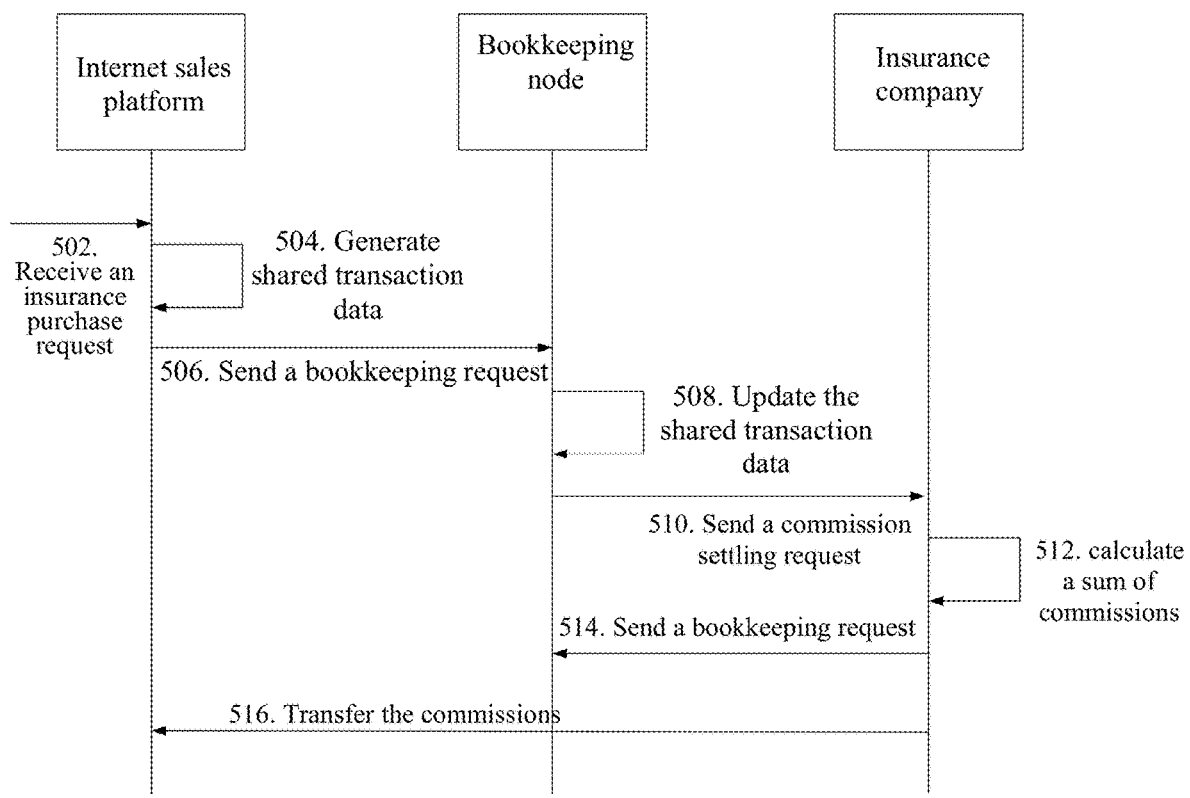
FIG. 5 is a schematic diagram of interactions using the blockchain-based data processing method in an application scenario of insurance transaction consortium blockchain according to some embodiments of the present application.

FIG. 5 is a schematic diagram of interactions using the blockchain-based data processing method in an application scenario of insurance transaction consortium blockchain according to some embodiments of the present application. The method comprises Step 502 to Step 516.

In Step 502, an Internet sales platform receives an insurance purchase request from a user. In some embodiments, after receiving the insurance purchase request from the user, the Internet platform sells a corresponding insurance to the user and records relevant transaction data.

In Step 504, the Internet sales platform generates shared transaction data. In some embodiments, before receiving the insurance purchase request from the user, the Internet sales platform creates a transaction data structure for a target transaction based on a UTXO model, the transaction data structure comprising a transaction ID, a transaction input unit, and a transaction output unit. When a new transaction occurs, the transaction data is consolidated according to the transaction data structure to generate shared transaction data.

In Step 506, the Internet sales platform sends a bookkeeping request to a bookkeeping node.

In Step 508, the bookkeeping node updates the shared transaction data. In some embodiments, the bookkeeping request carries the shared transaction data. Whether a state machine, an event and/or a trigger condition in a smart contract of the bookkeeping node meets a preset execution condition is monitored. If any of the state machine, the event and/or the trigger condition in the smart contract meets the preset execution condition, the smart contract meets the automatic execution condition, the task to calculate commissions is automatically executed, the commissions are calculated according to an amount insured in the shared transaction data and a ratio of the commissions to the amount insured, a bookkeeping account is determined according to the shared transaction data and an account mapping table in the smart contract, and an output unit of the shared transaction data is updated based on the commissions and the bookkeeping account. When the number of new transaction data structures reaches a preset threshold value N, the bookkeeping node packages and broadcasts the N transaction data structures to other blockchain nodes, so that other blockchain nodes reach a consensus on the transaction data structures.

In some embodiments, the bookkeeping node may be any node on the insurance transaction consortium blockchain, wherein the insurance transaction consortium blockchain is constructed based on a plurality of nodes of insurance companies and Internet sales platforms.

In Step 510, the bookkeeping node sends a to-be-settled transaction processing request to an insurance company. In some embodiments, the to-be-settled transaction processing request is a request for settling total commissions. Taking the preset condition being 3 transactions as an example, the bookkeeping node consolidates 3 pieces of to-be-settled transaction data to to-be-settled transaction data, and sends a to-be-settled transaction processing request to the insurance company.

In Step 512, the insurance company calculates a sum of to-be-settled amounts.

In Step 514, the insurance company sends a bookkeeping request to the bookkeeping node.

In Step 516, the insurance company transfers the commissions to the Internet sales platform. In some embodiments, the insurance company calculates a sum of 3 pieces of commissions in the to-be-settled transaction data, updates an output unit of the to-be-settled transaction data based on a calculation result, sends the calculation result to the bookkeeping node for bookkeeping, and transfers a corresponding amount of virtual currency to the Internet platform according to the calculation result.

In some embodiments, a distributed ledger is created between the Internet sales platform and the insurance company that is jointly maintained by both sides. Transaction data generated by each transaction on the Internet sales platform is subject to real-time calculation at the bookkeeping node, which greatly improves the efficiency of commission settlement. At the same time, the use of the blockchain may ensure the immutability and accuracy of transaction data.

In some embodiments, a computing device is further provided, comprising a memory, a processor, and a computer instruction stored on the memory and capable of running on the processor, wherein the processor, when executing the instruction, implements steps of the above-described blockchain-based data processing method.

In some embodiments, a computer readable storage medium storing a computer instruction is further provided, wherein the instruction, when executed by a processor, implements steps of the above-described blockchain-based data processing method.

An exemplary solution of the computer readable storage medium according to some embodiments is described above. It should be noted that the technical solution of the storage medium and the technical solution of the above-described blockchain-based data processing method belong to the same concept. For any details of the technical solution of the storage medium that are not described in detail, the above description of the technical solution of the blockchain-based data processing method may be referenced.

Particular embodiments of the present specification are described above, and other embodiments fall within the scope of the appended claims. In some cases, actions or steps stated in the claims may be executed in an order different from those in the embodiments and may still achieve desired results. In addition, a process depicted in the accompanying drawings does not necessarily require the illustrated particular order or continuous order to achieve desired results. In some implementation manners, multi-task processing and parallel processing may be feasible or may be beneficial.

The computer instruction comprises computer program codes, and the computer program codes may be in the form of source code, object code, executable file or some intermediate forms. The computer readable medium may include any entity or device capable of comprising the computer program codes, a record medium, a USB stick, a portable hard drive, a magnetic disk, an optical disc, a computer memory, a Read-Only Memory (ROM), a Random-Access Memory (RAM), an electric carrier wave signal, a telecommunication signal, and a software distribution medium. It should be noted that the content contained in the computer readable medium may be properly added or deleted as required by legislative and patent practices in the jurisdictions. For example, in some jurisdictions, the computer readable medium does not include electric carrier wave signals or telecommunication signals according to legislative and patent practices.

It should be noted that, for simple description, the above-described method embodiments are all expressed as a series of action combinations. However, those skilled in the art should be aware that the present application is not limited by the described order of actions, as according to the present application, some steps may be implemented in other orders or simultaneously. Second, those skilled in the art should also be aware that all the embodiments described in the present specification are preferred embodiments, and not all the involved actions and modules are necessarily required by the present application.

The above embodiments are described with various focuses. For a part of an embodiment that is not described in detail, the relevant description of other embodiments may be referenced.

The preferred embodiments of the present application disclosed above are merely used to help describe the present application. Optional embodiments do not thoroughly describe all details or limit the present invention only to the described exemplary implementation manners. Obviously, many modifications and variations may be made according to the content of the present specification. The present specification selects and describes these embodiments in detail for the purpose of better explaining principles and exemplary applications of the present application, so that those skilled in the art may better understand and use the present application. The present application is only subject to the claims and the full scope and equivalents of the claims.

The invention claimed is:

1. A blockchain-based data processing method, comprising:

creating, by a transaction-side blockchain node, a transaction data structure based on an Unspent Transaction Output (UTXO) model;

standardizing, by the transaction-side blockchain node, according to the transaction data structure, transaction data of a first transaction conducted on an online sales platform for a first purchaser to purchase a first insurance policy from an insurance company for a first premium;

executing, by the transaction-side blockchain node, a smart contract of the transaction-side blockchain node to automatically determine a to-be-settled commission amount for the standardized transaction data, the to-be-settled commission amount being a percentage of the first premium to be transferred from the insurance company to an account of the online sales platform for conducting the first transaction;

updating, by the transaction-side blockchain node, the standardized transaction data with the to-be-settled commission amount;

signing, by the transaction-side blockchain node, the updated standardized transaction data with a private key to form a signature;

sending, by the transaction-side blockchain node, the signature into a blockchain network;

validating, by the transaction-side blockchain node, the updated standardized transaction data;

upon a successful validation of the updated standardized transaction data:

consolidating, by the transaction-side blockchain node, the updated standardized transaction data into a hash block ID, broadcasting, by the transaction-side blockchain node, the hash block ID to the blockchain network, and consolidating, by the transaction-side blockchain node, the updated standardized transaction data into to-be-settled transaction data, wherein the to-be-settled transaction data:

is in a format of the transaction data structure, corresponds to multiple transactions conducted on the online sales platform to purchase multiple respective insurance policies from the insurance company for multiple respective premiums, and includes multiple to-be-settled commission amounts, each corresponding to a respective one of the multiple transactions, wherein the multiple transactions include the first transaction;

when a quantity of the multiple transactions reaches a preset threshold:

automatically generating, by the transaction-side blockchain node, a to-be-settled transaction processing request for settling the multiple to-be-settled commission amounts, the to-be-settled transaction processing request comprising the to-be-settled transaction data and a hash value corresponding to the to-be-settled transaction data; and transmitting, by the transaction-side blockchain node, the to-be-settled transaction processing request to a server-side blockchain node;

validating, by the server-side blockchain node, based on the hash value, the to-be-settled transaction processing request; and after validating the to-be-settled transaction processing request:

determining, by the server-side blockchain node, the sum of the multiple to-be-settled commission amounts in the to-be-settled transaction data;

updating, by the server-side blockchain node, the to-be-settled transaction data based on the sum;

writing, by the server-side blockchain node, the updated to-be-settled transaction data into the blockchain network; and transferring, by the server-side blockchain node, the sum of the multiple to-be-settled commission amounts to the account of the online sales platform, wherein each of the multiple to-be-settled commission amounts is a percentage of a respective one of the multiple respective premiums.

2. The method according to claim 1, wherein the transaction data structure comprises a transaction ID, a transaction input unit, and a transaction output unit, the transaction input unit comprising a signature unlocking script for spending an account balance and the transaction output unit comprising a locking script of an output balance for specifying a designated account to spend a corresponding UTXO unit.

3. The method according to claim 1, wherein executing the smart contract of the transaction-side blockchain node to automatically determine the to-be-settled commission amount for the standardized transaction data comprises:

calculating, by the transaction-side blockchain node, the to-be-settled commission amount as a percentage of the first premium;

determining, by the transaction-side blockchain node, the account of the online sales platform according to the standardized transaction data and an account mapping table in the smart contract; and updating, by the transaction-side blockchain node, an output unit of the standardized transaction data based on the to-be-settled commission amount and the account of the online sales platform.

4. The method according to claim 1, wherein, before creating the transaction data structure, the method further comprises:

determining, by the transaction-side blockchain node, a mapping relationship between transaction information and bookkeeping accounts;

generating, by the transaction-side blockchain node, a corresponding account mapping table according to the mapping relationship between transaction information and bookkeeping accounts;

creating, by the transaction-side blockchain node, the smart contract, wherein the smart contract comprises an account mapping table and a method for calculating the to-be-settled commission amount; and writing, by the transaction-side blockchain node, the smart contract into the blockchain network.

5. One or more non-transitory computer-readable storage mediums for blockchain-based data processing, configured with instructions executable by one or more processors to cause the one or more processors to perform operations comprising:

creating, by a transaction-side blockchain node, a transaction data structure based on an Unspent Transaction Output (UTXO) model;

standardizing, by the transaction-side blockchain node, according to the transaction data structure, transaction data of a first transaction conducted on an online sales platform for a first purchaser to purchase a first insurance policy from an insurance company for a first premium;

executing, by the transaction-side blockchain node, a smart contract of the transaction-side blockchain node to automatically determine a to-be-settled commission amount for the standardized transaction data, the to-be-settled commission amount being a percentage of the first premium to be transferred from the insurance company to an account of the online sales platform for conducting the first transaction;

updating, by the transaction-side blockchain node, the standardized transaction data with the to-be-settled commission amount;

signing, by the transaction-side blockchain node, the updated standardized transaction data with a private key to form a signature;

sending, by the transaction-side blockchain node, the signature into a blockchain network;

validating, by the transaction-side blockchain node, the updated standardized transaction data;

upon a successful validation of the updated standardized transaction data:
  consolidating, by the transaction-side blockchain node, the updated standardized transaction data into a hash block ID,
  broadcasting, by the transaction-side blockchain node, the hash block ID to the blockchain network, and
  consolidating, by the transaction-side blockchain node, the updated standardized transaction data into to-be-settled transaction data, wherein the to-be-settled transaction data:
    is in a format of the transaction data structure,
    corresponds to multiple transactions conducted on the online sales platform to purchase multiple respective insurance policies from the insurance company for multiple respective premiums, and
    includes multiple to-be-settled commission amounts, each corresponding to a respective one of the multiple transactions, wherein the multiple transactions include the first transaction;

when a quantity of the multiple transactions reaches a preset threshold:
  automatically generating, by the transaction-side blockchain node, a to-be-settled transaction processing request for settling the multiple to-be-settled commission amounts, the to-be-settled transaction processing request comprising the to-be-settled transaction data and a hash value corresponding to the to-be-settled transaction data; and
  transmitting the to-be-settled transaction processing request to a server-side blockchain node;

validating, by the server-side blockchain node, based on the hash value, the to-be-settled transaction processing request; and after validating the to-be-settled transaction processing request:
  determining, by the server-side blockchain node, the sum of the multiple to-be-settled commission amounts in the to-be-settled transaction data;
  updating, by the server-side blockchain node, the to-be-settled transaction data based on the sum;
  writing, by the server-side blockchain node, the updated to-be-settled transaction data into the blockchain network; and
  transferring, by the server-side blockchain node, the sum of the multiple to-be-settled commission amounts to the account of the online sales platform, wherein each of the multiple to-be-settled commission amounts is a percentage of a respective one of the multiple respective premiums.

6. The one or more non-transitory computer-readable storage mediums according to claim 5, wherein the transaction data structure comprises a transaction ID, a transaction input unit, and a transaction output unit, the transaction input unit comprising a signature unlocking script for spending an account balance and the transaction output unit comprising a locking script of an output balance for specifying a designated account to spend a corresponding UTXO unit.

7. The one or more non-transitory computer-readable storage mediums according to claim 5, wherein the operations further comprise, before creating the transaction data structure:
  determining, by the transaction-side blockchain node, a mapping relationship between transaction information and bookkeeping accounts;
  generating, by the transaction-side blockchain node, a corresponding account mapping table according to the mapping relationship between transaction information and bookkeeping accounts;
  creating, by the transaction-side blockchain node, the smart contract, wherein the smart contract comprises an account mapping table and a method for calculating the to-be-settled commission amount; and
  writing, b y the transaction-side blockchain node, the smart contract into the blockchain network.

8. The method according to claim 2, wherein after the transaction data of the first transaction is standardized according to the transaction data structure, and the standardized transaction data is updated with the to-be-settled commission amount:
  the transaction ID includes an identifier of the first transaction,
  the transaction input unit includes the first premium and an identifier of the first insurance policy, and
  the transaction output unit includes the to-be-settled commission amount.

* * * * *